Patented Apr. 29, 1947

2,419,932

UNITED STATES PATENT OFFICE 2,419,932

ARYLIDES OF ORTHO-HYDROXY CARBOXYLIC ACID

Harry Wilhelm Grimmel, Easton, and Alfred Guenther, Riegelsville, Pa., assignors to General Aniline & Film Corporation, New York, N. Y., a corporation of Delaware No Drawing. Application October 19, 1944, Serial No. 559,479

9 Claims. (Cl. 260—247)

This invention relates to new arylides of ortho-hydroxy carboxylic acids and to a process of preparing the same. More particularly, it relates to the compounds of the general formula:

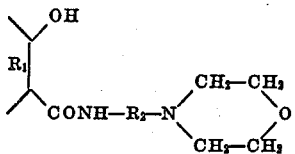

wherein

represents a radical of the group consisting of the naphthalene, anthracene, carbazole, benzo-carbazole, diphenylene oxide, diphenylene sulfide, fluorene and fluorenone radicals, and $R_2$ represents a radical of the benzene series linked directly through a carbon atom of the benzene ring with the nitrogen atom of both the amido and morpholine groups which may contain substituents such as alkyl, alkoxy, halogen, the nitro group and the like, for example, methyl, ethyl, methoxy, ethoxy, chlorine and trifluoromethane groups, etc., but not water-solubilizing groups, such as a sulfonic acid or carboxylic acid group.

The new compounds are useful as coupling compounds in the production of azo dyes of the direct-developed type and are distinguished from analogous arylides by a reduced substantivity, a property making them particularly valuable for printing. We have found that the presence of the morpholine group on the aryl radical to which the nitrogen atom of the amido group is attached reduces the substantivity of the arylides, making them easily removable from the unprinted areas of the goods padded therewith. In contrast, analogous arylides not so substituted by the morpholine group are hard to remove.

The new arylides of our invention may be formed by reacting in accordance with known methods for amide formation the corresponding ortho-hydroxy carboxylic acids with arylamines of the formula:

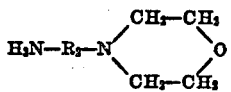

wherein $R_2$ has the aforesaid significance, for example, by the action of the acid halide or acid ester of the desired ortho-hydroxy carboxylic acid, e. g., 2-hydroxy-3-naphthoic acid, 2-hydroxy-anthracene-3-carboxylic acid, 2-hydroxy-carbazole-3-carboxylic acid, 2-hydroxy-benzo-carbazole-3-carboxylic acid, 2-hydroxy-phenylene oxide-3-carboxylic acid, etc., on the aryl amine, by the action of the ortho-hydroxy carboxylic acid or its sodium salt on the aryl amine or its salt with the aid of a condensing agent, such as phosphorus trichloride or phosphorus oxychloride, by the action of the ortho-hydroxy carboxylic acid on isocyanates, or in any other manner found suitable.

The morpholine substituted aromatic amines may be prepared in known manner, for example, by condensing ortho- or para-nitrochlorbenzene compounds with morpholine at elevated temperatures with subsequent reduction of the nitro compounds.

The invention is further illustrated by the following specific examples to which, however, it is not to be limited, and wherein we have described a preferred method for the preparation of the new arylides, which stated generally, comprises condensing the ortho-hydroxy carboxylic acid or its sodium salt in equimolecular proportions with the morpholine-substituted aromatic amine in an inert solvent such as toluene, xylene, chlorobenzene, etc., with the aid of phosphorus trichloride. Parts are by weight.

*Example 1*

210 parts of the sodium salt of 2-hydroxy-3-naphthoic acid are added to 1300 parts of toluene. There is further added under agitation 247 parts of 4-(2-amino-4-carbon trifluoride phenyl)-morpholine. The mixture is heated to 75° C. and at this temperature 65 parts of phosphorus trichloride are slowly added. The reaction mixture is now brought to a gentle reflux and maintained at the reflux temperature until the evolution of hydrogen chloride ceases. The reaction mixture is permitted to cool to room temperature and the product arylide of the formula

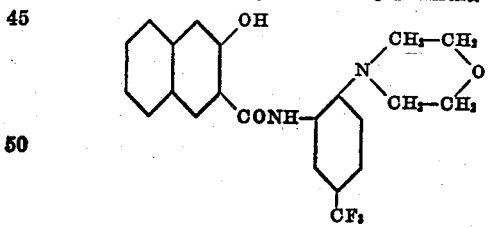

separated by filtration and washed with toluene on the filter. The product is further purified by subjecting the filter cake to a slightly soda alkaline steam-distillation to free it from toluene, filtered, washed neutral and dried.

Example 2

Following the process of Example 1, the arylide of the formula:

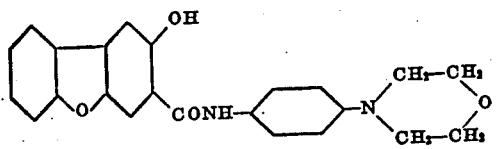

is obtained by condensing 228 parts of 2-hydroxy diphenylene oxide-3-carboxylic acid with 178 parts of 4-p-aminophenyl morpholine.

Example 3

227 parts of 2-hydroxy-carbazole-3-carboxylic acid are added to 2000 parts of chlorobenzene. To this are added under agitation 233 parts of 4-(2-nitro-4-aminophenyl)-morpholine and the mixture heated to 75° C. at which temperature 65 parts of phosphorus trichloride are slowly added. The condensation, separation and purification steps are carried out as in Example 1. The product arylide has the formula:

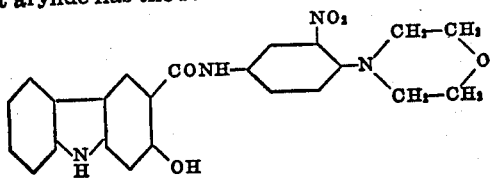

The arylides of the formula:

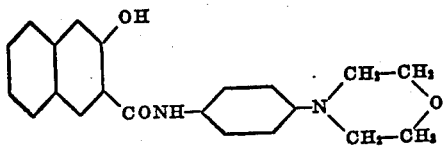

and

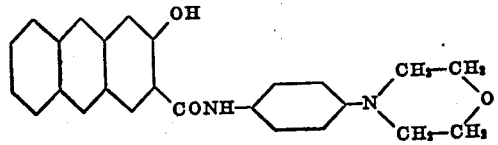

may be prepared in like manner from 2,3-hydroxy-naphthoic acid and 2-hydroxy-anthracene-3-carboxylic acid, respectively, or their sodium salts, with 4-p-aminophenyl morpholine.

We claim:

1. A process of making an arylide which comprises condensing an ortho-hydroxy carboxylic acid compound of the general formula:

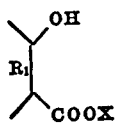

wherein X represents one of the group H and Na, and

represents a radical of the group consisting of the naphthalene, anthracene, carbazole, benzocarbazole, diphenylene oxide, diphenylene sulfide, fluorene and fluorenone radicals, with an aromatic amine of the general formula:

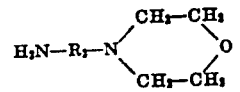

wherein $R_2$ represents a radical of the benzene series linked directly through a carbon atom of the benzene ring with the nitrogen atom of both the amido and morpholine groups, free from water-solubilizing groups, in the presence of an inert solvent and a condensing agent.

2. A process of making an arylide which comprises condensing one of the group consisting of 2,3-hydroxy-naphthoic acid and the sodium salt thereof with an aromatic amine of the general formula:

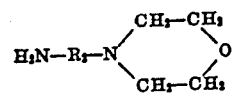

wherein $R_2$ represents a radical of the benzene series linked directly through a carbon atom of the benzene ring with the nitrogen atom of both the amido and morpholine groups, free from water-solubilizing groups, in the presence of an inert solvent and a condensing agent.

3. A process of making an arylide which comprises condensing one of the group consisting of 2,3-hydroxy-naphthoic acid and the sodium salt thereof with an aromatic amine of the general formula:

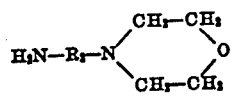

wherein $R_2$ represents a radical of the benzene series linked directly through a carbon atom of the benzene ring with the nitrogen atom of both the amido and morpholine groups, free from water-solubilizing groups, in the presence of an inert solvent and phosphorous trichloride.

4. A process of making an arylide which comprises condensing one of the group consisting of 2,3-hydroxy-naphthoic acid and the sodium salt thereof with an aromatic amine of the general formula:

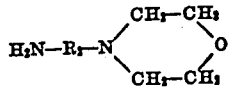

wherein $R_2$ represents a radical of the benzene series linked directly through a carbon atom of the benzene ring with the nitrogen atom of both the amido and morpholine groups, free from water-solubilizing groups, in the presence of toluene and phosphorous trichloride.

5. Arylides of the general formula:

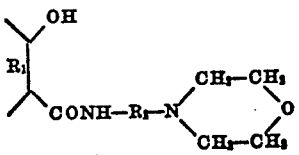

wherein

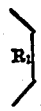

represents a radical of the group consisting of the naphthalene, anthracene, carbazole, benzocarbazole, diphenylene oxide, diphenylene sulfide, fluorene and fluorenone radicals and $R_2$ represents a radical of the benzene series linked directly through a carbon atom of the benzene ring with the nitrogen atom of both the amido and morpholine groups, free from water-solubilizing groups.

6. Arylides of the general formula:

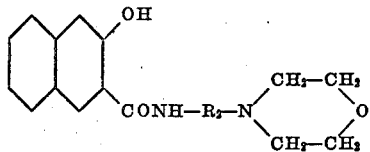

wherein $R_2$ represents a radical of the benzene series linked directly through a carbon atom of the benzene ring with the nitrogen atom of both the amido and morpholine groups, free from water-solubilizing groups.

7. Arylides of the general formula:

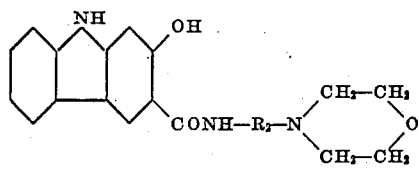

wherein $R_2$ represents a radical of the benzene series linked directly through a carbon atom of the benzene ring with the nitrogen atom of both the amido and morpholine groups, free from water-solubilizing groups.

8. Arylides of the general formula:

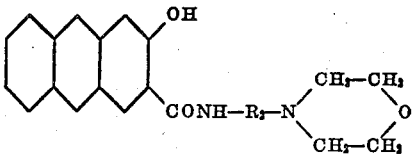

wherein $R_2$ represents a radical of the benzene series linked directly through a carbon atom of the benzene ring with the nitrogen atom of both the amido and morpholine groups, free from water-solubilizing groups.

9. The arylide of the formula:

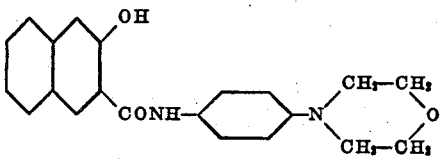

HARRY WILHELM GRIMMEL.
ALFRED GUENTHER.

REFERENCES CITED

The following references are of record in the file of this patent:

UNITED STATES PATENTS

| Number | Name | Date |
|---|---|---|
| 2,210,072 | Fischer et al. | Aug. 6, 1940 |
| 2,265,433 | Kershaw et al. | Dec. 9, 1941 |